Sept. 26, 1950 L. R. NELSON 2,523,628
MECHANISM FOR SECURING HOSE TO HOSE FITTINGS
Filed Dec. 11, 1947 3 Sheets-Sheet 1
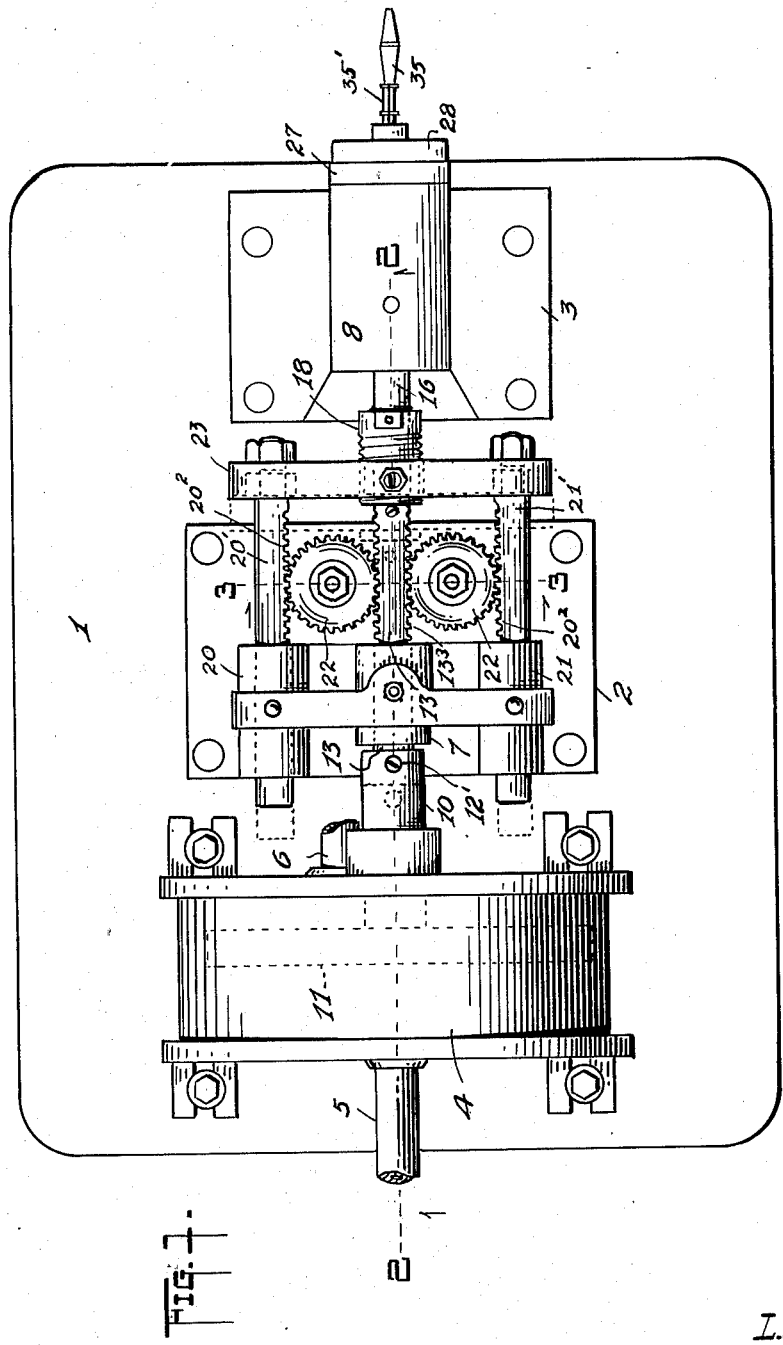
Inventor
L.R.Nelson,
By L. M. Thurlow
Atty.

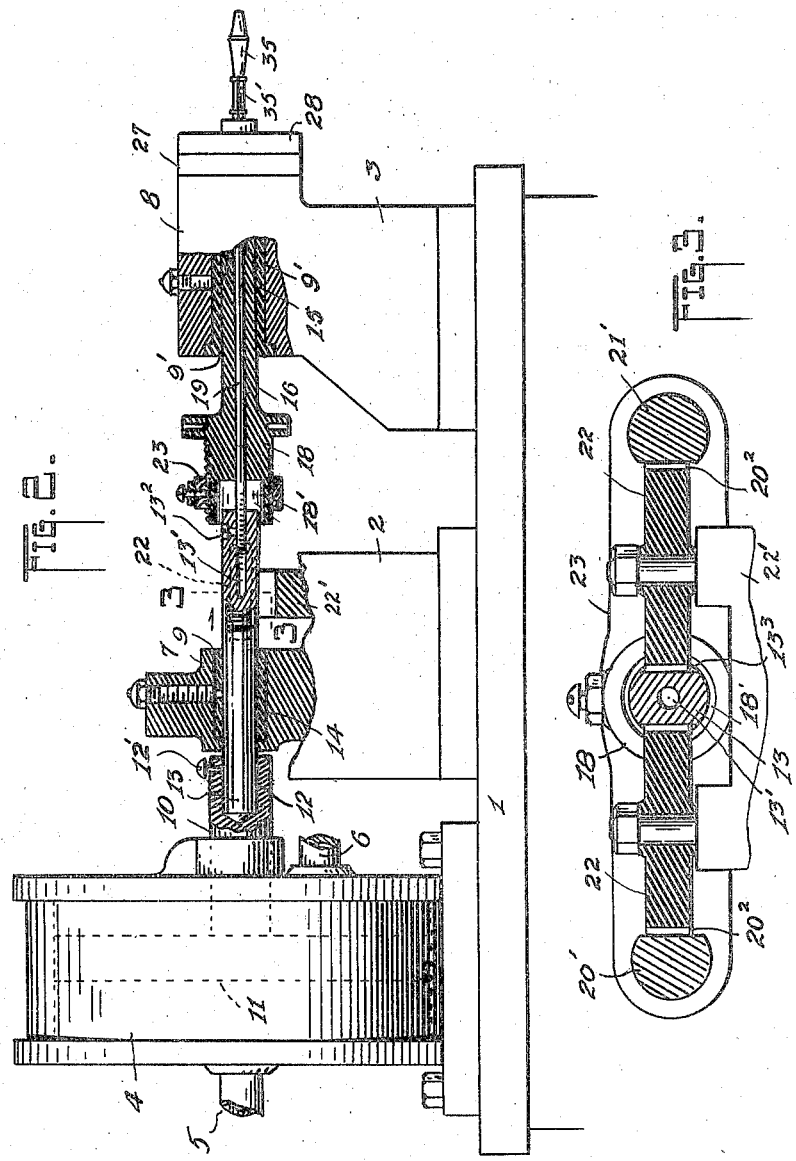

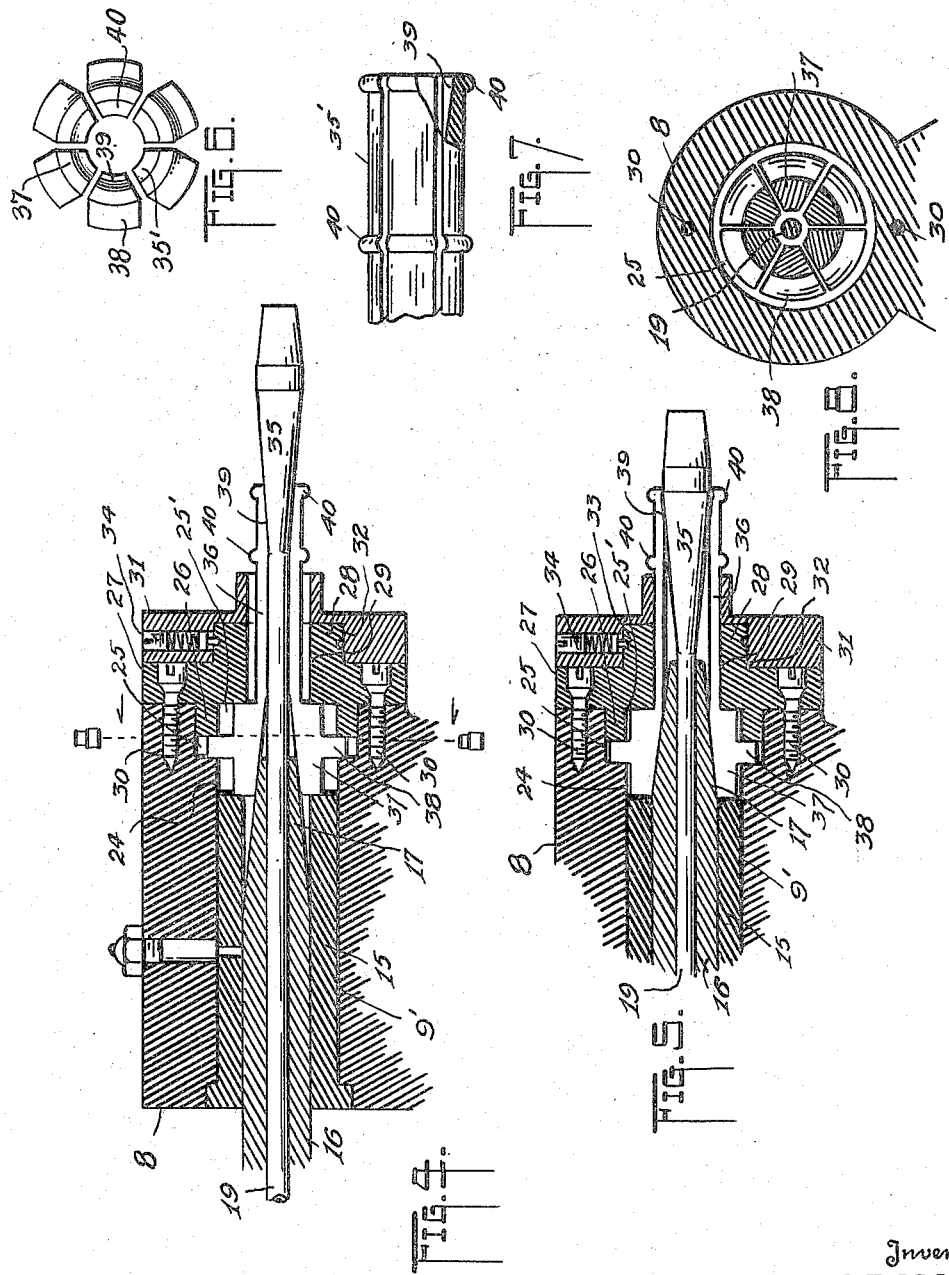

Patented Sept. 26, 1950

2,523,628

UNITED STATES PATENT OFFICE 2,523,628

MECHANISM FOR SECURING HOSE TO HOSE FITTINGS

Lewen R. Nelson, Peoria, Ill.

Application December 11, 1947, Serial No. 791,124

5 Claims. (Cl. 153—80)

This invention pertains to a machine for connecting hose ends to hose fittings. More particularly, the invention relates to apparatus for expanding the shank of a hose fitting into engagement with the wall of a hose, so clamping the hose between the shank of the fitting and a surrounding ferrule, in the general manner disclosed in Patent Number 2,338,666, to Lewen R. Nelson.

The main object of the invention is to provide apparatus by which to insure equal operations of expander portions upon the shank of a hose fitting whereby said shank may more positively secure a hose end between them.

Another object lies in more accurately operating upon expander portions by which said portions are shifted in parallelism in engaging the ferrule of a hose fitting to the end that a hose-end will be more firmly held with the least chance of creeping.

Still another object is that of providing a pair of coaxial members, shiftable one with respect to the other in opposite directions, adapted to jointly and accurately engage expander portions simultaneously for operating upon the shank of a hose fitting, and, further, to provide mechanism for more accurately shifting said members into engagement with said expander portions.

That the invention may be understood the accompanying drawings are provided forming part hereof, wherein:

Figure 1 is a plan of the machine according to the present invention.

Figure 2 is a side elevation of the same shown in part section.

Figure 3 is an enlarged transverse section of line 3—3 of Figs. 1 and 2.

Figures 4 and 5 are longitudinal sections much enlarged of mechanism entering into the machine structure, showing two different positions of operation.

Figures 6 and 7 are, respectively, an end elevation and a side elevation, much enlarged, of an expander segment assembly employed in the apparatus of the invention, and Figure 8 is a transverse section on line 8—8 of Fig. 4.

In Figures 1 and 2 a base member 1 is indicated arising from which are two supports 2 and 3 for carrying certain mechanism to be described, said base member in this instance also having mounted thereon an air pressure cylinder 4 connected with which are pipes 5, 6 for introducing air under pressure to either side of its piston 11.

The supports 2 and 3 terminate in heads 7 and 8, respectively, each having a bore 9, 9' respectively, aligned with each other and with the piston rod 10. The piston rod is bored at 12 to receive a rod 13 in a snug fit and held by any suitable means such as a set screw 12'. Seated in said bore 9 of the head 7, preferably, is a sleeve or bushing 14 to receive said rod 13 in a snug sliding fit. Also, in the head 8 is a bushing 15 to likewise receive a tubular member or rod 16 which at one end is tapered as at 17, Figures 4 and 5, while its other end terminates in a threaded portion 18, provided with a bore 18' for reception of an end of the rod 13, on occasion, the latter rod having a bore 13' which aligns with a bore of said rod 16, both bores receiving a rod 19 in a snug slidable fit, said rod being part of a mandrel to be understood later. In the present instance the rod 19 has threaded engagement with the rod 13 in the bore 13' of the same by which adjustments may be made, one in respect to the other, a set screw 13² serving to secure these said rods in any position of adjustment.

As parts of the support 2 are two fixed guide portions 20 and 21, see Figure 1, bored to receive reciprocating rack bars 20' and 21', respectively, said rack bars lying at opposite sides of and spaced from the rod 13, and lying in the same plane therewith as considered in distance from the base 1, a middle guide portion being that heretofore designated as the head 7.

The teeth 20² of said rack bars face teeth 13³ at each side of said rod 13, and a gear wheel 22 lies at each side of the latter to mesh with its teeth as well as with the teeth of one of the said rack bars as indicated, the said gear wheels being mounted to rotate on axes arising from a support 22' as best shown in Figures 2 and 3. A crosshead 23 receives through its ends the ends of said rack-bars and affixed thereto in any suitable manner, said cross-head also encircling the earlier mentioned threaded portion 18 of the rod 16.

Referring, now, to the head 8 previously referred to, it is observed that the sleeve or bushing 15 at one end terminates distant from the forward end of said head 8 leaving a cavity 24. Also, it will be seen that the wall of said head has at 25 a larger bore adjacent the terminal of said sleeve. This larger bore receives into it an extension 26 of a member 27, the latter abutting the end of said head 8, said extension lying in spaced relation to a face of said head 8 at the bore 25 thereby creating an annular recess 25' and having a bore substantially equal to the bore 9', for example, it being noticed that the hub 28 extends from the member 27 at its side opposite the side thereof having the named extension 26. It will be noted that the extension 26 does not completely fill the cavity which it occupies, thus leaving at 25 an annular recess or groove. The member 27 has a reduced bore 29, which may equal in diameter to said bore 9', and screws 30 serve to secure the member 27 to the head 8, the screws preferably lying entirely within said member.

A capping member 31 has a bore 32 to receive into it the hub 28, said member abutting the member 27 and said hub. The hub may preferably have a groove 33 encircling it to receive into it a spring controlled plunger 34 carried in the capping member 31.

The named rod 19 extends entirely through and beyond the tubular rod 16 at its tapered end at 17, also extending outside the head 8 and has a portion 35 tapered toward the tubular rod 16 and opposed to it. Said rod at this end may be termed a mandrel while the tubular rod 16 may be termed a ram. Thus, the rods 16 and 19 constitute a mandrel and ram assembly having opposed tapered work faces at 17 and 35 which upon relative movement of the rods 16 and 19 are drawn together or moved apart to effect radial movement of an expander segment assembly, hereinafter described, which surrounds the work faces of the mandrel and ram.

Figures 6, 7 and 8 show a series of segments 35' forming what may be termed a generally cylindrical expander segment assembly, said segments adapted to be forced radially outward from a central point. Two of these segments are shown in place in Figures 4 and 5 wherein the straight shank portion 36 of each lies in the bore of the members 27 and 31. Each shank at what may be termed its inner end has a hub or mounting portion 37 having an exteriorly directed shoulder or flange 38 which lies between the extension 26 of the member 27 and a wall of the head 8 opposite said extension, the flange or shoulder 38 thus engaging in the groove 25. The mounting portion 37 of each segment lies between the end of the bushing 15 and the face of member 27, thus being engaged in the annular recess 25'. Each mounting portion 37 has an inner tapered surface complementary to the tapered work face at 17 of the ram. The opposite end of each segment includes an exteriorly exposed work engaging surface to engage the shank of the hose fitting or other part to be expanded, and also includes at 39 an interior tapered surface complementary to the tapered work face 35 of the mandrel.

In Figure 4, it is noted, the tapered tubular rod or ram and tapered head of the mandrel are widely separated. For this reason the segments 36—37 lie nearest the ram and mandrel, whereas in Figure 5 said ram and the taper of the mandrel lie adjacent each other by reason of which the segments have been moved to positions within the cavities therefor, the mandrel having such position as to perform work upon a hose fitting and the hose through the several segments as the latter are thus expanded. Also, in Figs. 4-5, it will be noted that while portions 37 and 38 of the segment are substantially as wide as the annular recesses at 25' and 25, respectively, their transverse dimenions, that is, their height, are less than the depth of the corresponding recesses. Thus, the mounting portions 37 and shoulder 38 of the segments are held against longitudinal movement in the guide member or head 8, but are free to move radially of the guide member 8.

The described structure of the head 8 or an equivalent arrangement admits of readily erecting and disassembling the machine parts. The capping member 31 may be released by the withdrawal of the plunger 34 from the groove 32 whereupon the member 27 may be removed after withdrawing the screws 30, the cavity holding the segment being thus exposed.

The rod portion 19 of the mandrel may be adjusted lengthwise by turning it on its threads in the rod 13, and lengthwise adjustment of the ram 16 is made possible by turning the threaded portion 18 thereof within the outer head 23, and thus the operated parts are properly adjusted relatively in longitudinal directions for the exact work to be performed.

In the present instance the piston 11 is operated by air pressure, and driven in opposite direction for imparting like directions of movement to the piston rod 19 carrying the rod 13, the latter controlling said ram 16 and said mandrel.

Though not shown, valving arrangements are employed to reverse the piston travel through the air induction pipes 5 and 6.

While this type of power is employed other power means may, perhaps, be used where a quick, positive and accurate action may result.

It is vitally important that there be no lag in timing in the shifting movements relatively in respect to the mandrel and ram in their approach to the segments 35' for spreading the same. That is to say, it was found that if one or the other were to lag, the member first to apply pressure upon the segments created displacement of the latter, and sometimes breakage of one or more of them, naturally causing a stoppage of operations and replacement of damaged or broken parts. That this may not result, an exactitude of joint shifting of said mandrel and ram is paramount as provided by the mechanism described.

In Figure 4 the mandrel 35 is in its outermost or extreme position where it can perform no work. This same position is shown in Figures 1 and 2, and for this reason the rod 13 is at its limit of travel toward the right in those figures. Upon introduction of air under pressure through the pipe 6, the piston is forced toward the left, thus drawing the mandrel in the same direction through the said rod 13 and the associated mandrel rod 19. During this movement the described teeth on the rod 13 rotate the gears 22, which in meshing with the teeth of the rack bars 20' and 21', transmit an opposite direction of movement to ram of the rod 16 through the cross-head 23, the said mandrel and ram thus approaching each other simultaneously so that both engage the segments 35 and force them outward radially to perform their work.

A reversal of air pressure upon the piston 11 returns the mandrel and ram to the separated position, releasing the article operated upon.

The particular arrangement described providing for opposite direction of travel of the mandrel and ram is but a preferred type. Naturally, means other than this may be employed. This is also true of the manner of adjusting the named members with respect to each other, and with respect to the segments upon which they operate.

The arrangement of the structures that shift the mandrel and ram is such that the latter are always limited in distance of travel, especially when approaching each other for segment engagement.

The mentioned foot lever, not shown, when operated reverses the air pressure after each article has been operated upon.

The ability to adjust the mandrel and ram in respect to each other by the means heretofore described insures accurate operation upon work being handled.

Through use of a foot controlled air valve system, not shown, it is clear that rapid production of finished goods must result.

The provision of opposed parts such as the mandrel and ram whereby the segments of an expansible member are spread to the same extent throughout or, it may be said, in parallelism, has been found to be of importance especially in respect to the exacting manipulations required in attaching a hose fitting to a hose of a much used soft type having no reinforcing material in its makeup, and therefore being difficult to secure in a hose fitting.

I claim:

1. Mechanism for the purpose described including a guide member, a mandrel and a ram assembly slidably fitting one in the other, both being mounted and guided in a longitudinal shifting movement therein, and both being shiftable relatively with respect to each other in opposite directions, each member of the assembly having a tapered extremity to jointly approach each other, expander segments mounted in said guide member in position to receive said tapered extremities, said guide member and the segments having provision for prevening the latter shifting in the direction of the axes of the mandrel and ram, a cylinder fixed with respect to the guide member for receiving a pressure exerting medium, a piston therein including a piston-rod, the latter having operative connection with a member of said mandrel and ram assembly, a rack-bar having teeth at opposite sides thereof included in the operative connection of said member with said piston-rod, a guide member disposed at each side of the line of travel of said assembly and fixed relative to said cylinder, a rack bar shiftable in each of said guide members and paralleling assembly, each being a part of the connection of the structure operatively connected with the other member of said assembly, a cross-head rigidly connected to the rack bars, and a pair of rotatably mounted gear wheels, each having engagement with one of said rack bars, and both having engagement with the first named rack bar.

2. In an apparatus for expanding a tubular work member, a guide member having a central bore and a groove in the wall of said bore extending transversely of said guide member; a mandrel and ram assembly mounted for longitudinal shifting motion within said guide member and comprising a tapered ram and a mandrel slidably mounted within said ram and bearing a tapered portion extending beyond and opposed to said tapered ram; an expander segment assembly mounted in said guide member between said guide member and said mandrel and ram assembly, each expander segment of said assembly having an exposed work piece engaging portion and also including an unexposed interior ram engaging portion and an exterior flange engaged in said groove but being of a height less than the depth of said groove; power means operatively connected to said mandrel to draw the tapered portion thereof against said expander segment assembly, and ram actuating means actuated by said power means and operatively connected to said ram to move said tapered ram into engagement with said ram engaging portion of said expander segment assembly simultaneously with movement of said mandrel by said power means to move said segments into operative position to expand said tubular work member.

3. In an apparatus for securing hose ends to hose fittings, the combination of a guide member having a bore including an annular recess in the wall thereof lying transversely of said bore; an expander segment assembly including a mounting portion carried within said bore and a hose fitting engaging portion situated outside of said guide member, each expander segment of said assembly including a shoulder engaged in said recess but having a height less than the depth of the recess, engagement of the shoulders of said segments in said recess preventing longitudinal shifting of said expander assembly relative to said guide member but allowing radial movement of said segments; a ram and mandrel assembly comprising a tapered ram and a mandrel slidably mounted within said ram and including a tapered portion extending beyond and opposed to said tapered ram, said ram and mandrel assembly being slidably carried within the bore of said guide member with the opposed tapered portions of said ram and said mandrel arranged to engage opposite end portions of said expander segments, moving said segments radially outward, as the ram and mandrel are drawn together; power means, and operative connections between said power means and said ram and mandrel for simultaneously moving said ram and mandrel to draw the tapered portions thereof together.

4. In an apparatus for securing hose ends to hose fittings, the combination of a ram having a tapered work face; a mandrel slidable within and extending through said ram and including a tapered work face extending beyond and opposed to the tapered work face of said ram; an expander segment assembly surrounding the work faces of said ram and mandrel, movement of said work faces toward each other causing the segments of said assembly to move radially outward, each segment of said assembly including a mounting portion and a portion for engaging the interior of a hose fitting; a guide member embracing said ram and including means receiving the mounting portions of said segments for restricting them to radial motion only; reciprocating power means; a shaft for imparting motion of said power means to said mandrel, said shaft being aligned with said mandrel, laterally opposed surfaces of said shaft constituting rack faces; a pair of pinions each rotating on a fixed axis, each of said pinions meshing with one of said rack faces of said shaft; a pair of rack bars; guide means mounting said rack bars for reciprocating movement parallel to said shaft with the teeth of each of said rack bars in engagement with one of said pinions and facing the corresponding rack face of said shaft, and means connecting said rack bars jointly to said ram.

5. In an apparatus for securing hose ends to hose fittings, the combination of a ram having a tapered work face; a mandrel slidable within and extending through said ram and including a tapered work face extending beyond and opposed to the tapered work face of said ram; an expander segment assembly surrounding the work faces of said ram and mandrel, movement of said work faces toward each other causing the segments of said assembly to move radially outward; a guide member having a bore receiving said ram for longitudinal shifting motion and including an annular groove extending transversely of said guide member, each expander segment of said assembly including a hose fitting engaging portion situated outside of said guide member and a positioning shoulder engaged in said groove but having a height less than the depth of said groove, reciprocating power means; a power shaft aligned with said mandrel and connecting said power means to said mandrel, laterally opposed surfaces of said shaft constituting rack faces; a pair of pinions each mounted for rotation on a fixed axis and meshing with one of said rack faces of said shaft; a pair of rack bars; guide means mounting said rack bars for reciprocating movement parallel to said shaft with the teeth of each of said rack bars in engagement with one of said pinions and facing the corresponding rack face of said shaft, and a cross-head connecting said rack bars and said ram.

LEWEN R. NELSON.

REFERENCES CITED

The following references are of record in the file of this patent:

UNITED STATES PATENTS

| Number | Name | Date |
|---|---|---|
| 7,003 | Maguire | Jan. 8, 1850 |
| 198,547 | Meyer | Dec. 25, 1877 |
| 609,011 | Criggal | Aug. 16, 1898 |
| 1,022,720 | Buckley | Apr. 9, 1912 |
| 1,039,948 | Hunter | Oct. 1, 1912 |
| 1,150,153 | Strauss | Aug. 17, 1915 |
| 1,640,655 | Hartman | Aug. 30, 1927 |
| 2,319,216 | Dewald | May 18, 1943 |
| 2,338,666 | Nelson | Jan. 4, 1944 |
| 2,350,410 | Murphy | June 6, 1944 |
| 2,427,685 | Midtlying | Sept. 23, 1947 |